United States Patent [19]
Kulinets

[11] Patent Number: 6,005,940
[45] Date of Patent: Dec. 21, 1999

[54] SYSTEM FOR SECURELY STORING AND READING ENCRYPTED DATA ON A DATA MEDIUM USING A TRANSPONDER

[75] Inventor: Joseph M. Kulinets, Stamford, Conn.

[73] Assignee: Software Security, Inc., Conn.

[21] Appl. No.: 08/857,244

[22] Filed: May 16, 1997

[51] Int. Cl.[6] .................................................. H04L 9/00
[52] U.S. Cl. .................................. 380/21; 380/4; 380/48; 380/20; 360/60
[58] Field of Search ................................ 360/60; 369/58; 380/3, 4, 20, 21, 48, 49

[56] References Cited

U.S. PATENT DOCUMENTS

| | | | |
|---|---|---|---|
| 4,388,643 | 6/1983 | Aminetzah | 380/20 |
| 4,535,355 | 8/1985 | Arn et al. | 380/10 |
| 5,629,981 | 5/1997 | Nerlikar | 380/25 |
| 5,905,798 | 5/1999 | Nerlikar et al. | 380/3 |

*Primary Examiner*—Pinchus M. Laufer
*Attorney, Agent, or Firm*—Pollock, Vande Sande & Amernick

[57] ABSTRACT

A self contained data medium is provided with an apparatus for generating a decrypting key for decrypting stored data. Frames of encrypted data are stored on the data medium such as a video or audio disk. Each frame of data includes a header which has a frame identification number. A reader reads each frame of data including the header with the frame identification number. The reader transmits the frame number to a transponder attached to the data medium. The transponder includes a decryption engine which calculates a decryption key from the frame number and a secret deciphering key stored in the transponder. The transponder transmits the decryption key to the reader which uses the decryption key to decrypt the frame of data. The system discourages both home copying and commercial piracy of the underlying program material.

19 Claims, 7 Drawing Sheets

SYSTEM FOR SECURELY STORING AND READING ENCRYPTED DATA ON A DATA MEDIUM USING A TRANSPONDER

BACKGROUND OF THE INVENTION

The present invention relates to a system for maintaining data stored on a data medium secure against unauthorized copying and use. Specifically, an encrypted data medium is provided which includes a self contained apparatus for generating a decrypting key for decrypting the stored data from information read from the data medium.

The explosion of digital data technology has produced a demand for mass marketed data media in the form of optical disks and magnetic tapes which include program information other than computer software stored as digital data. These mass produced memory devices may contain audio or video records which are often used on equipment such as CD players and audio tape players which are not equipped with any type of security device which will prevent unauthorized copying. The ability to prevent the manufacture and use of illicit copies of these recordings has been a serious problem for the legitimate owners of the underlying copyrighted works. The source of illicit copying is from both home copying and commercial piracy. The availability of home recording devices permits on a very limited scale the manufacture of copies which diminish the market for the legitimate copies. While a single home copier will not individually create a large number of copies, it is expected that copying equipment will be so widespread that the total number of home copies will be very significant to the loss of commercial sales.

A related and potentially more serious threat to the legitimate producer of video and audio recordings is commercial piracy. The profit potential for illicit copies is so great that the threat of criminal sanctions, confiscation of plant and equipment has failed to deter these activities. For this reason, a system which will protect against copying and illicit use, and which does not rely upon a separate hardware device to be separately connected to the data reading hardware is desirable.

Security against copying of mass marketed data mediums may be increased by encrypting the data before recording on the medium, and further enhanced by changing the encryption key for each title, as well as for individual data frames of each title, frustrating any efforts to determine a universal decryption key. In order to provide such enhanced security, the keys for each title and each frame within a title must be supplied with the data medium in an undiscoverable form A body of technology has developed for maintaining digital data such as computer software stored on a data medium, which is also the subject of wide spread copying piracy, inaccessible to unauthorized users. One common solution used to frustrate unauthorized use and copying of consumer software includes the provision of a hardware device mounted to a port of the computer which executes the software. During execution of the software, data which is necessary for the execution to proceed is recovered from the hardware device which may be a ROM. Unless the hardware device is possessed by the software user, the program cannot be executed. Duplicates of the software, therefore, are not usable without the corresponding ROM.

Adapting these measures to the problem of copying video and audio disks and magnetic tapes requires that a separate hardware device be provided with the encrypted software in order to recover the key necessary to decrypt the video or audio disk. The device must be difficult to replicate or analyze, and be capable of supplying the needed decryption keys on a title by title and a frame by frame basis to allow an authorized user to use the data.

SUMMARY OF THE INVENTION

It is an object of this invention to provide a data medium of encrypted data which frustrates the manufacture of illicit copies of the data medium.

It is a more specific object of this invention to provide a data medium having encrypted data and self contained deciphering hardware.

These and other objects of the invention are accomplished by storing encrypted data on a data medium with the decrypting information. The data medium includes a self contained transponder having a deciphering engine. A reader reads the encrypted data as well as the unique decrypting information which is stored with each frame of encrypted data. The reader is equipped with a transceiver for transmitting the decrypting information to the transponder. The transponder deciphers the decrypting information into a decryption key and transmits the key to the reader where it is used by a decryption circuit in the reader to decrypt the data read from the data medium.

In one aspect of the invention, the transponder is mounted directly to the data medium. Power for the transponder is inductively coupled from the reader to the transponder. The deciphering engine within the transponder receives from the reader decrypting information contained within a header of each frame of the encrypted data. The transponder deciphering engine calculates a unique decryption key for each frame of the stored data from the decrypting information and forwards it to the reader so that the individual frames of the encrypted data may be decrypted.

DESCRIPTION OF THE PREFERRED EMBODIMENT

Figure 1:
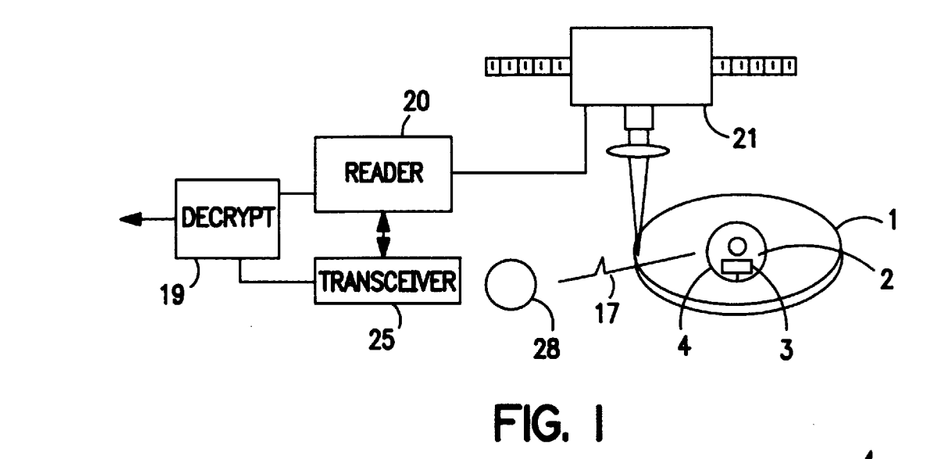
FIG. 1 illustrates a CD-ROM 1 or DVD having a self-contained transponder for calculating a decryption key.
Figure 2:
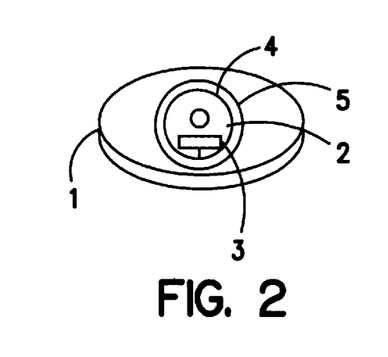
FIG. 2 is another implementation of a CD-ROM or DVD having a transponder fixed to a label on it for calculating a decryption key.
Figure 3:
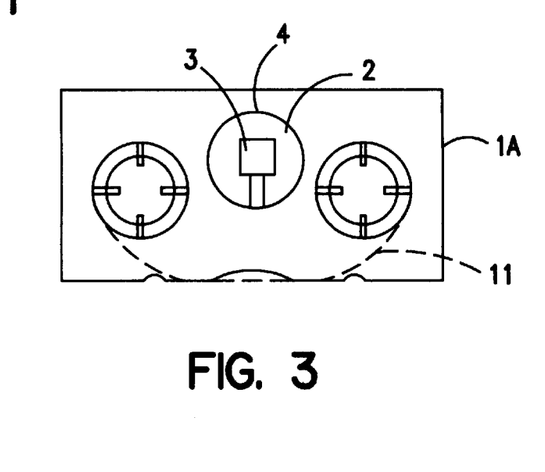
FIG. 3 shows an audio cassette 1 having a transponder 2 which calculates a decryption key.

FIG. 1 illustrates an optical disk carrier (ODC) 1 which may be a DVD, audio CD or CD-ROM which is read by an optical scanning head 21. The optical disk data carrier 1 includes a transponder 2 fixed to the disk carrier 1 having a transponder microelectronic chip 3 connected to an antenna 4. The transponder 2 is either embedded within the body of the disk or attached thereto with conventional adhesive. FIG. 2 illustrates another embodiment of a optical disk carrier 1 having a stick-on label 5 containing the microelectronic chip 3 and antenna 4. FIG. 3 illustrates the same transponder 2 fixed to a magnetic cassette tape 1A in a similar manner. The transponder microcircuit 3 is inductively powered from a magnetic or electrical field generated by the reader 20.

The ODC 1 of FIG. 1 is read with optical scanning head 21 which directs a coherent optical beam to the surface of the ODC 1. Reflections from the surface of the ODC 1 are converted into digital data by the optical scanning head 21. As will be evident from a detailed description of the data format recommended for the ODC 1, the reader 20 will recover header information associated with each frame of encrypted data stored on the ODC 1 including a frame identification number. A transceiver 25 communicates with the transponder 2 through an electromagnetic bi-directional link 17. As the distances are small, the required transmission channel power is very low. Further, the reader 20 and its associated transceiver 25 generate a magnetic field which is used to transmit operational power to the transponder 2.

The encrypted data is read from the ODC 1 on a frame-by-frame basis. The reader 20 identifies a frame number within the header of each read frame which may be either a consecutive number from a frame numbering system, or may be a random number unique to a specific frame. The read frame number is transferred to a transceiver 25.

Transceiver 25 communicates via a bi-directional link 17 to the transponder 2. The transponder 2 includes a deciphering engine 10 that implements a deciphering algorithm D to be used in deriving the frame decryption key FDK. The deciphering algorithm D can be any block ciphering algorithm, such as DES, Feal, KeeLoq, etc. The frame decryption key FDK is derived by deciphering the frame number using the algorithm D and secret deciphering key $DK_A$ internally stored in transponder 2. The transponder 2 transmits the decryption key FDK via the bi-directional link 17 to the transceiver 25. The frame decryption key FDK is used in a decryption circuit 19 to decrypt the encrypted frame data which follows the frame header.

Thus, the foregoing implementation provides, along with a data medium, a transponder 2 which is necessary to decrypt each frame of data stored thereon. The ODC 1 cannot be duplicated and later read and decrypted without the transponder 2. As will be evident when describing the details of transponder 2, the stored information necessary for calculating the decryption key FDK may not be read from the transponder 2. Thus, while it may be possible to reproduce the stored data 1, without a corresponding transponder 2 having the secret information embedded therein for deriving a decryption key FDK, the duplicated ODC 1 is useless.

Figure 4:
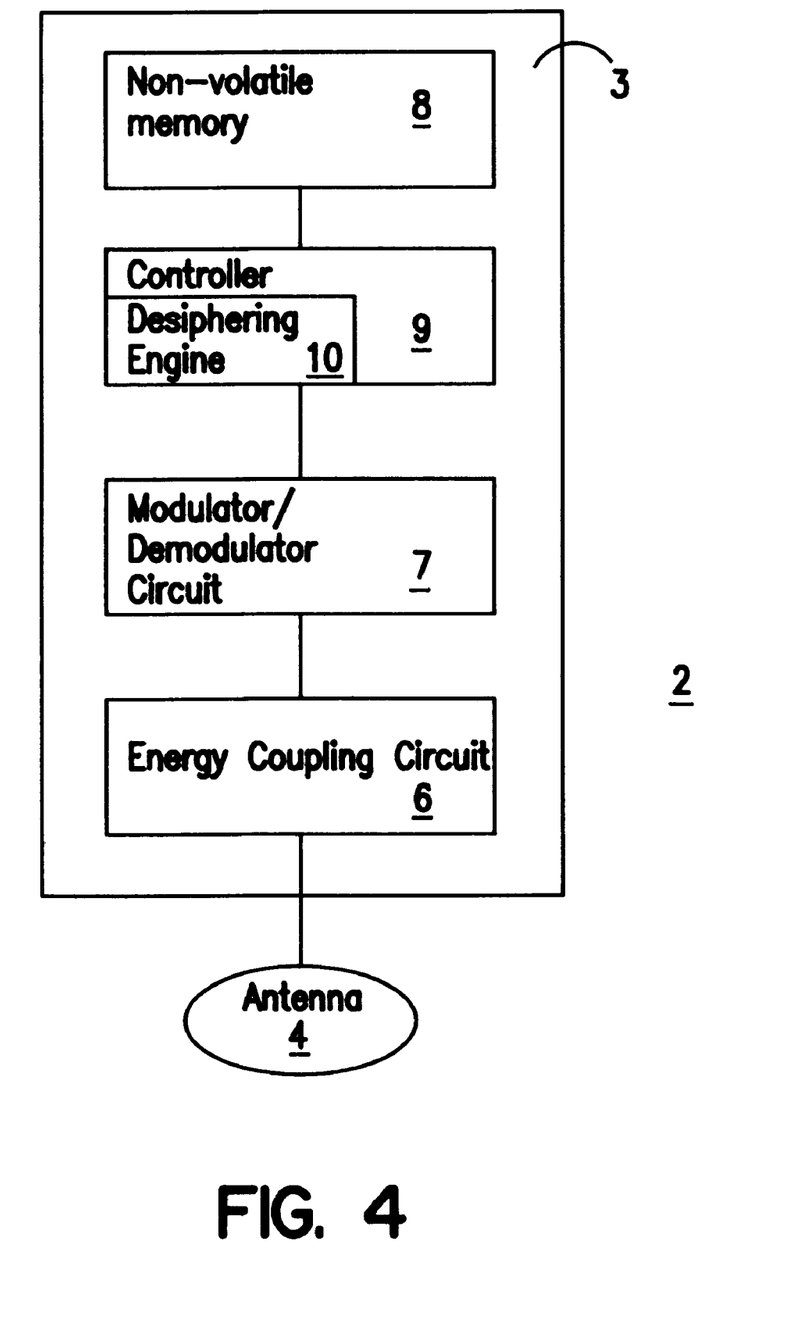
FIG. 4 is a block diagram of transponder 2 which determines a decryption key from information received from the reader.

FIG. 4 is a block diagram of the transponder 2. The transponder 2 comprises a microcircuit 3, which includes a controller 9 having a deciphering engine 10. A non-volatile memory 8 stores secret deciphering key $DK_A$ which is unique for any particular ODC title, as well as an algorithm used by deciphering engine 10 to combine the deciphering key with the received frame number. The non-volatile memory 8 is configured such that its contents may not be read from the non-volatile memory 8, thereby maintaining secrecy and avoiding an illicit decryption of ODC 1.

An energy coupling circuit 6 is shown which couples electromagnetic energy from the reader 20 to the microchip 3 of the transponder 2. The transponder 2 is based on the known RF ID systems, such as the commercially available transponder HCS 410 manufactured by Microchip Technology, Inc. These systems have been implemented in so called identity: "friend or foe" (IFF) systems. The transponder 2 issues a given response when a given input information is received based on the secret deciphering key stored inside it.

The energy coupling circuit 6 inductively couples a.c. current from an a.c. magnetic field produced from the reader 20. The a.c. current is then rectified by the coupling circuit 6 to produce d.c. operating voltage for the deciphering engine 10, non-volatile memory 8, and modulator/demodulator 7. The modulator/demodulator 7 generates a modulated carrier for transmission to the reader transceiver 25, as well as demodulates transmissions received from transceiver 25.

The deciphering engine 10 is based on a set of executable instructions retrieved from the non-volatile memory 8. The deciphering engine 10 is configured from the instructions set executed by an internal processor of microcircuit 3. For each frame number received via the bi-directional channel 17, the deciphering engine 10 reads key $DK_A$ from memory 8, and combines $DK_A$ with the frame number in an algorithm stored in non-volatile memory 8 to generate the frame decryption key:

$$FDK_i = D(DK_A, i).$$

The calculated decryption key $FDK_i$ is transmitted via the modulator/demodulator circuit 7 and antenna 4 to the transceiver 25 of the reader 20.

Figure 5A:
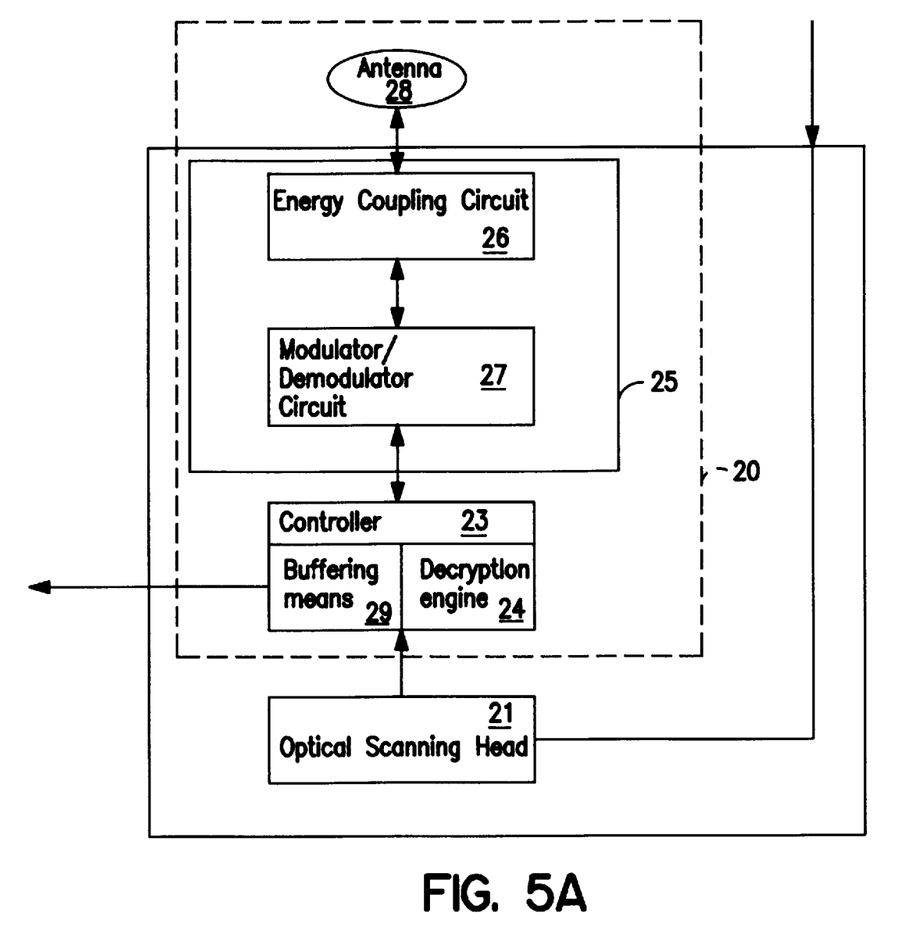
FIG. 5A illustrates a reader for reading and decrypting information contained on a data medium.

FIG. 5A illustrates a more detailed block diagram of the reader circuit 20 for reading the encrypted frame data and decrypting the frame data with the decryption key $FDK_i$ received from the transponder 2. The transceiver 25 is shown to include an energy coupling circuit 26 which provides the electromagnetic field via antenna 28 to the transponder 2. The energy coupling circuit 26 generates the alternating field sufficiently large to create the operating power for the transponder 2 which is only located a matter of inches away. Demodulator/modulator circuit 27 provides for communication over the bi-directional link 17 through either a magnetic communication or electromagnetic, or radio frequency communication via antenna 28 depending on the particular microcircuit 3 used for transponder 2.

The controller 23 is shown which is programmed to provide the decryption engine 24 with the decrypting key $FDK_i$ received from the transponder 2 via the bi-directional link 17. A buffering means 29 under control of controller 23 stores each frame of data, including the header associated with the frame, which is received from the optical scanning head 21.

The invention may also be implemented so that decryption takes place inside the reproduction device or a computer. For this purpose, the decryption key $FDK_i$ and the encrypted data $EC_i$ from the controller 23 are transferred to the reproduction device or a computer where the data is then decrypted.

The decrypted data $PC_i$ produced by the buffering means 29 can then be utilized by either a digital computer, digital video disk player, or other digital playback means, It is, of course, possible to copy the decrypted data which is transferred at this point, which may therefore constitute a source of illicit copying.

Figure 5B:
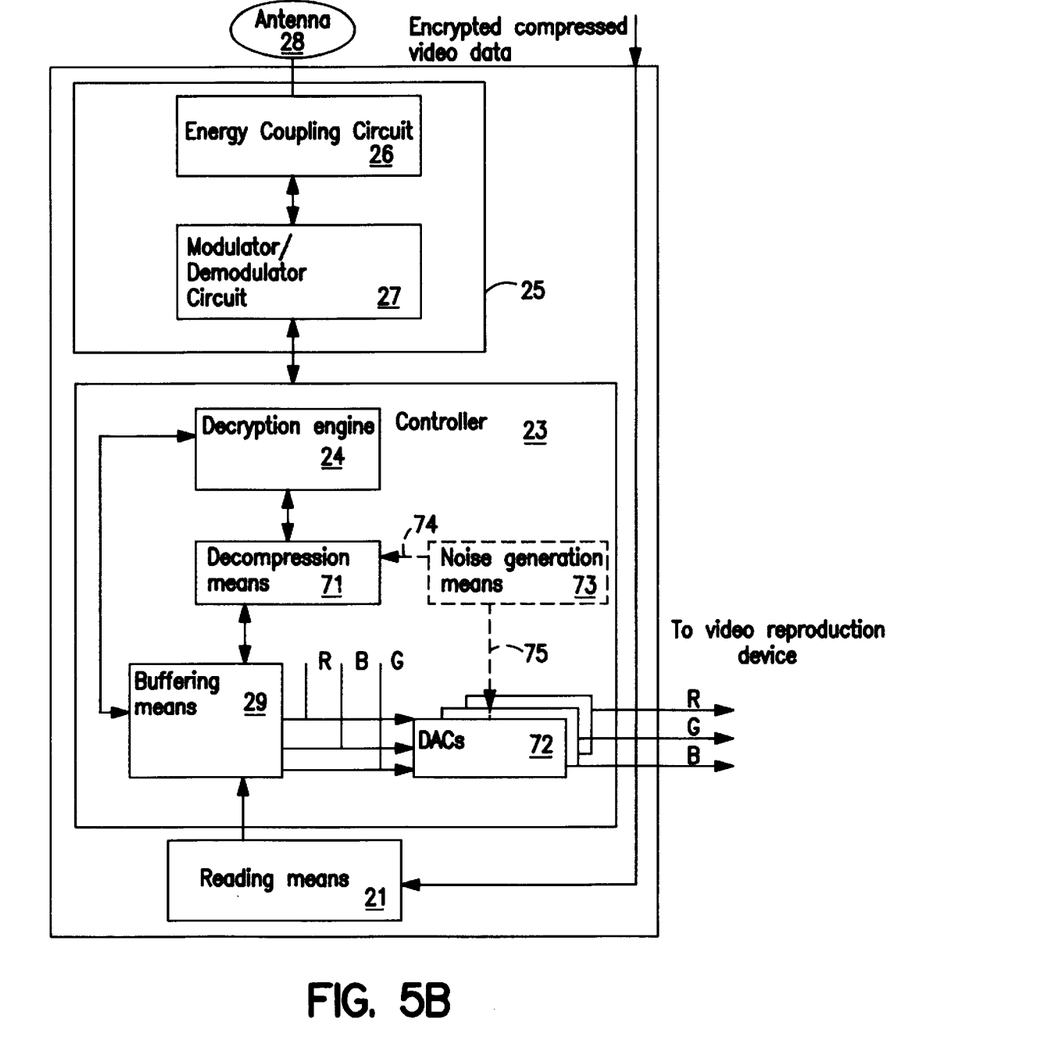
FIG. 5B illustrates a reader for reading and decrypting information contained on a data medium which had been previously compressed.

As an aid to frustrating copying of the decrypted data, FIG. 5B illustrates an implementation of the present invention which would further discourage such copying of video and audio materials. Referring now to FIG. 5B, there is shown a decompression means 71. The implementation of FIG. 5B envisions that the digital video data, such as a movie, would be compressed using a standard compression technique, such as MPEG-2, prior to the data encryption and storing on the ODC 1.

During the process of decrypting the stored data by decryption engine 24, a decompression of the data would occur following decryption by the decompression circuit 71. It should be noted that the decompression circuit could be additional software instructions contained in controller 23, or may in fact be a separate hardware device. The decompression is effected on the stored data in buffer 29. The decompressed frames of data are accumulated in the buffer 29, and are then converted in FIG. 5B by digital analog converters 72 into analog video signals R, G and B.

In most cases, the compression/decompression process is not lossless, in that each time a compression and decompression occurs, the quality of the signal degrades. This degradation, although not objectionable on the first copy being made from the R, G and B reproduced analog signals, would be further degraded if an attempt to create a master of the recording was attempted. The subsequent data compression necessary to create a master disk for creating large numbers of copies would significantly degrade image quality to render them commercially unappealing.

In the event that the degradation of data quality from compression/decompression is not sufficient, a noise generator 73 may be implemented for adding digital pseudo random weak noise to the inputs of the digital to analog converters 72, which will slightly corrupt the image reducing its quality. The noise degraded signal, while not being unobjectionable for making a single copy, or directly viewing the image on a video screen, would, however, produce an inferior master for making additional copies. The dashed lines 74 and 75 of FIG. 5B indicate that the noise may be added either to the decompression circuit 71, or, may in fact, be applied as an analog signal to each of the R, G and B video signals.

Figure 6:
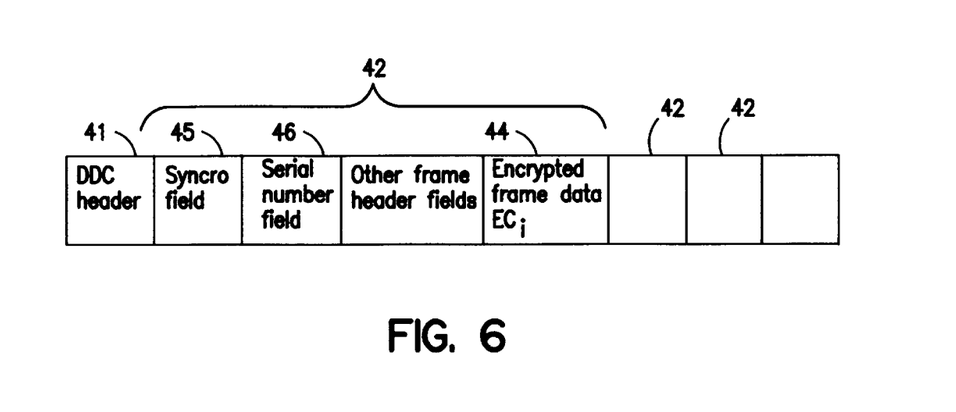
FIG. 6 illustrates a frame header for each frame of encrypted data contained on the data medium.

The structure of the frame header which precedes every frame recorded on the data media is shown more particularly in FIG. 6. Referring now to FIG. 6, the arrangement of the data stored on media 1 is shown to include a DDC header 41 preceding multiple frames of data 42. Each frame of data 42 includes a frame header 43. The length of each frame 42, including the header 43, is selected based on the capacity of the buffering means 29 to store the complete frame. The data contained in the frame 42 is encrypted in accordance with a encryption technique to be described in detail with respect to FIG. 8. One of the fields within the frame header 43 is serial number field 46. The serial number field 46 contains a number representing the particular frame associated with the frame header 43. The first field of the frame header 45 contains the special synchronization data that permits location of the beginning of the frame by optical scanning head 21 starting from any place on the data media. Thus, each flame may be individually accessed, and not necessarily in order. The encrypted data 44 may also be compressed, as is known to those skilled in efficiently recording data.

Figure 7:
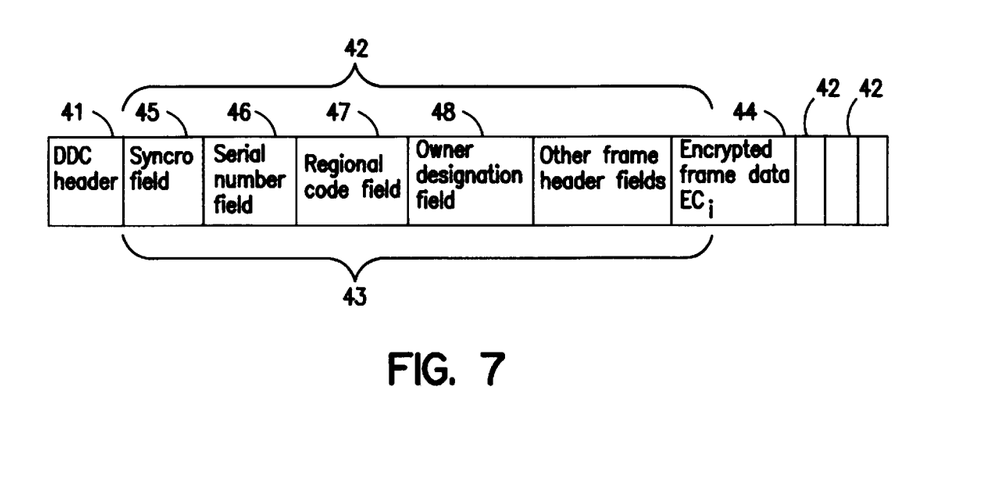
FIG. 7 illustrates another frame header for each frame of encrypted data contained on the data medium.

The above system for maintaining stored data secure against unauthorized use can be adapted to protect digital video disk recordings. In these recordings, regional codes can be entered into a field of each frame of the encrypted data. The regional codes insure that first run movies released to movie theaters do not face competition from a version which was recorded on digital video disk for home use. The regional codes are set up such that digital video disks released in designated world regions can not be read by a reader 20 sold in any other region due to the presence of the regional code. Referring to FIG. 7, the foregoing feature can be provided by including within the header 43 of the frame 42 additional fields 47 and 48. The regional code field 47 contains a regional code identifying the region where the digital video disk may be played. The special code in field 47 is assigned to non-copyright protected or home recorded materials. The title identification field 48 identifies the owner of the copyrighted material with a special identification code assigned to the copyrighted material.

During a playback mode, the contents of fields 47–48 are also an input to the deciphering algorithm, along with the frame number in field 46.

Further, the various readers 20 are configured to include a circuit for comparing the regional code contained in field 47 with a locally stored regional code embedded in the reader 20 circuitry. If an attempt is used to play a digital video disk intended for sale in one region, in a reader 20 intended for sale in another region, the circuitry inhibits the read operation.

The foregoing structure of a digital video disk may also be sold as a blank recording medium having a default value $DK_{DEFAULT}$ written in the non-volatile memory 8 of the transponder 2.

Figure 8:
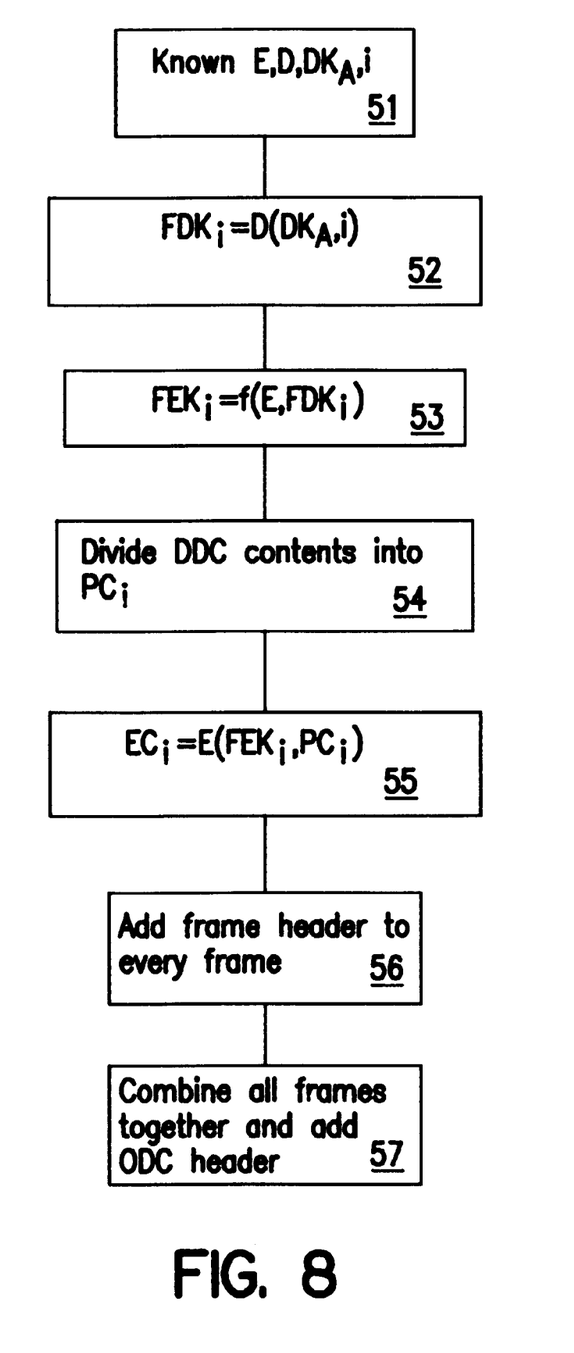
FIG. 8 is a flow chart illustrating how data is encrypted before storing on a data medium.

FIG. 8 illustrates the process for preparing data for storage on a data medium with frames of encrypted data 42 having a format shown in FIG. 6. The plain contents $PC_i$ of each separate frame i should be preliminarily encrypted. The encryption is made using a special encryption algorithm E and the separate precalculated frame encryption key $FEK_i$ for each frame i. The encryption algorithm E has a counterpart: the reverse decryption algorithm U to be used for the decryption of contents of ODC 1 by the decrypting engine 24 inside the ODC reader 20. For each compilation of data A to be stored on a data medium, a separate secret deciphering key $DK_A$ is selected. This value of $DK_A$ will be written in the non-volatile memory 8 of the transponder 2 of the ODC 1 having this particular encrypted data and used by the transponder 2 to derive a key to decrypt a stored data. There is no means to read the deciphering key $DK_A$ back from the non-volatile memory 8.

The process begins in step 51 by selecting a known encryption algorithm E, with the known reverse algorithm U, and a deciphering algorithm D implemented in the deciphering engine 10 of transponder 2, and deciphering key $DK_A$ chosen for the specific data compilation.

Based on the above information and the known frame number i, the frame encryption key $FEK_i$ for particular frame i is calculated based on a frame decryption key $FDK_i$ which will be used to decrypt a data from this frame.

An individual decryption key $FDK_i$ is determined for every frame i of data stored on the ODC 1 as a result of the application of the deciphering algorithm D used in the deciphering engine 10 of a transponder 2 with deciphering key $DK_A$, and with the frame serial number i as an input data:

$$FDK_i = D(DK_A, i). \hspace{2cm} \text{step 52}$$

Based on the encryption/decryption algorithm E/U, the frame encryption key $FEK_i$ is calculated in step 53 from each decryption key $FDK_i$ for each frame i as follows:

$$FEK_i = f(E, FDK_i).$$

In many encryption/decryption algorithms, symmetry is provided such that the frame encryption key is equal to the frame decryption key:

$FEK_i=FDK_i.$

The initial compilation of data to be placed on ODC 1 is divided into separate frames $PC_i$ in step 54 where $PC_i$ is the plain contents of the frame i.

Using an encryption algorithm E in step 55, the contents $PC_i$ of every frame i is encrypted differently as $EC_i$. Based on the particular value of the encrypted frame key $FEK_i$:

$$EC_i=E(FEK_i, PC_i).$$

The resulting encrypted contents $EC_i$ from frame i are supplied with the frame header in step 56. One of the fields of the frame header, as shown in FIG. 6, includes a frame identification number i which may be a serial number. It is possible to replace the serial number i with any random number which does not affect any of the foregoing encryption and decryption processes.

The encrypted frames $EC_i$ are then combined with the ODC header 41 in step 57 to comprise a recording master for reproducing the encrypted data medium. Copies of the recording master are manufactured and then physically combined with the transponder 2. In the process of manufacturing, the particular secret deciphering key $DK_A$ is written into a transponder 2 of every copy of this particular title. The write operation can be done with the special instructions using the came RF channel and the equipment known in the state of the art. The deciphering key $DK_A$ is stored in the non-volatile memory 8 of the transponder 2 and can not be read from the outside of the transponder 2. There is no need to put specific restrictions on the write key operation because the value of the key $DK_A$ itself is the only ODC producer's secret in the system.

Figure 9:
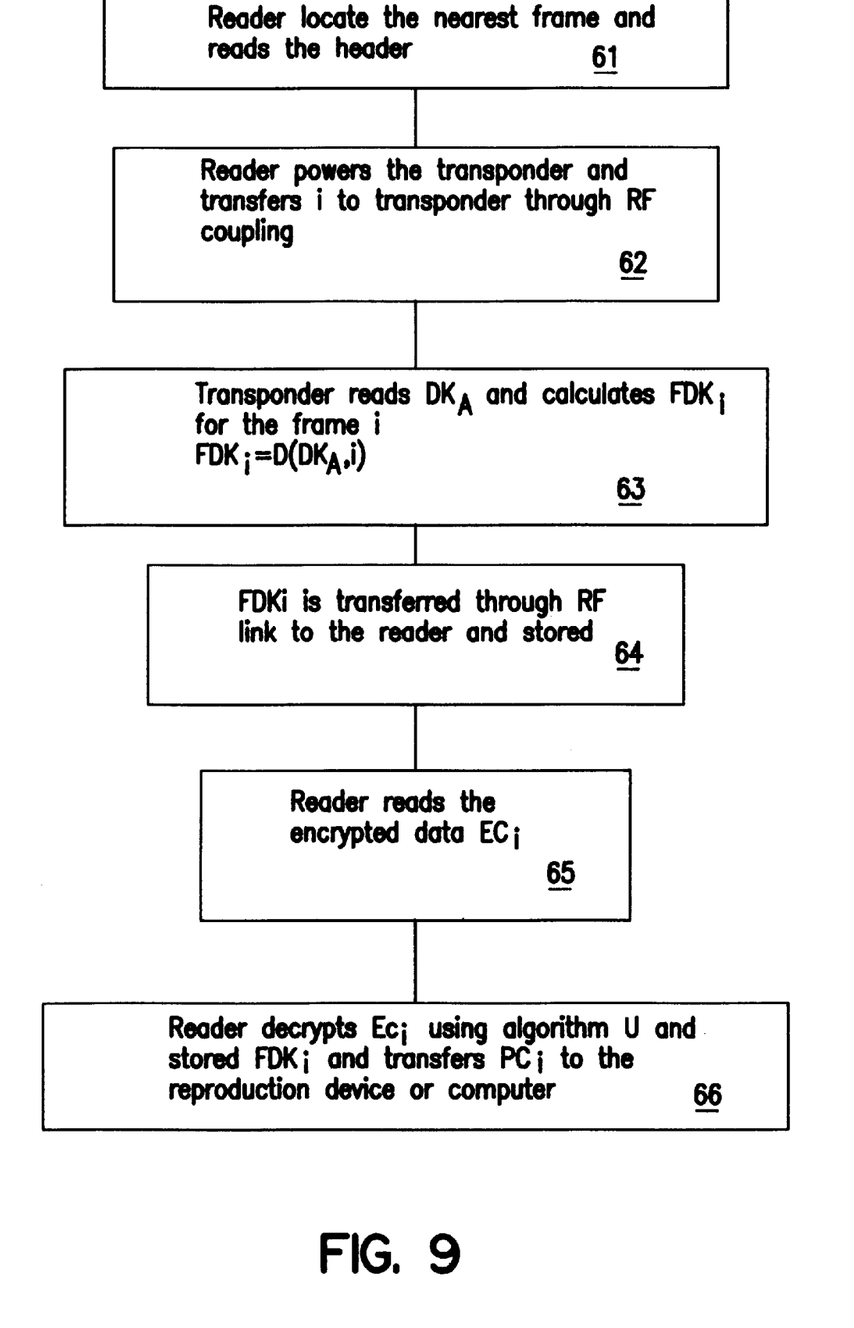
FIG. 9 illustrates the process for recovering and decrypting data from the data medium.

The system operation is summarized in FIG. 9. With the ODC 1 inserted, a reader 20 finds the desired reading position based on the instructions from the computer. The reader 20 reads the data from the ODC 1 with the optical scanning head 21, locates the nearest frame 42 based on the special synchronization features of the record, and reads its respective header in step 61. The reader 20 also energizes the power generation circuitry and energy coupling device 26 of FIG. 5 providing power to the transponder 2. The electromagnetic energy transferred from reader 20 to the transponder 2, wakes up the microprocessor controller 9 of the transponder 2. The transponder 2 listens for incoming signals from the transceiver 25. Once the transponder 2 and transceiver 25 have communicated over the bi-directional link 17 by exchanging handshake protocol signals, the reader 20 in step 62 transfers the read value of the frame number i as a challenge to transceiver 25 over the bi-directional link 17 to the controller 9 in the transponder 2. When the challenge data is received, the controller 9 reads the value of the deciphering key $DK_A$ from the non-volatile memory 8, and the deciphering engine 10 combines $DK_A$ with frame number i in the deciphering algorithm D. The deciphering algorithm D derives a decryption key $FDK_i$ in step 63. Using the bi-directional link 17, of the transponder 2, forwards the decryption key $FDK_i$ for the current frame to the reader 20 as a response to the challenge value comprising the frame number i in step 64. The decryption key $FDK_i$ is stored within the decryption engine 24 of FIG. 5. The reader 20 then reads the encrypted data ECi of the frame in step 65. The contents of the frame are decrypted in step 66 using the stored algorithm U and the received frame decryption key $FDK_i$. The remaining frames of the encrypted data medium are then read and the process of FIG. 9 begins again to decrypt the following frame until all frames of the data medium have been read and decrypted.

As an alternative embodiment of the invention, it is possible to set up the frame such that it represents decryption information for a subsequent frame. This provides for a delay to allow the transponder and reader to exchange data before decrypting the frame data.

Thus, there has been described with respect to one embodiment a system for securely storing data on a data medium. Those skilled in the art will recognize yet other embodiments described more particularly by the claims which follow.

What is claimed is:

1. A secure data medium comprising;
   a data track containing encrypted data and information for decrypting said data; and
   a transponder means, associated with said data medium, said transponder means including means for determining a decryption key from said information transmitted to it from a reader reading said data track, and for forwarding said decryption key to a means for decrypting said data.

2. The secure data medium according to claim 1, said means for determining a decryption key including a memory storing data which is combined with said information received from said reader to derive a decryption key.

3. The secure data medium according to claim 2, wherein said data track is divided into frames of encrypted data, and each frame of encrypted data has information for decrypting the frame.

4. The secure data medium according to claim 3 wherein said information for decrypting a frame is the serial number of the frame.

5. The secure data medium according to claim 1 said transponder means including on energy coupling circuit for providing energy to power said transponder.

6. The secure data medium of claim 1 said transponder means including a stored data key which is combined in an algorithm with said decryption information by said means for determining to derive said decryption key.

7. An apparatus for reading encrypted data stored in frames on an data medium comprising:
   a reader means for reading said data one frame at a time, said reader means reading an identifier included in a header in each of said frames, said reader means including a transceiver device for transmitting said identifier and receiving a response thereto; and
   a transponder means, supported on said data medium, which communicates with said transceiver, and which includes a deciphering engine and a read only memory storing a secret deciphering key, said deciphering engine calculating a frame decryption key from said identifier and forwarding said frame decryption key to said reader where it is used to decrypt said frame.

8. The apparatus for reading encrypted data according to claim 7, wherein said transponder calculates a new decryption key for each frame read by said reader.

9. The apparatus for reading encrypted data according to claim 7, said transponder means including an energy coupling device which couples operating energy from said reader to provide operating power to said transponder.

10. The apparatus for reading encrypted data according to claim 7 wherein said deciphering engine calculates said frame decryption key by combining a stored key in an algorithm with each received frame identification number.

11. An apparatus for decrypting data stored on a data medium comprising:
   a reader means, for reading encrypted data from said medium, as well as information for determining a decryption key for said data contained on said data medium, said reader means including decryption means for decrypting said encrypted data with said decryption key;

a transceiver means, associated with said reader means, for transmitting said information for determining a decryption key and for receiving a decryption key for decrypting said encrypted data; and a transponder means, associated with said data medium, for receiving said information for determining a decryption key, and generating a decryption key from said information, said transponder means forwarding said decryption key to said transceiver means whereby said reader is provided with a decryption key for decrypting said encrypted data.

12. The apparatus according to claim 11 said reader including means for decompressing said data.

13. The apparatus according to claim 11 wherein said transponder means determines a new decryption key for each frame of data contained on said data medium.

14. The apparatus according to claim 13 wherein new decryption information is transmitted to said transponder each time a new frame of data is read.

15. The apparatus according to claim 11 wherein said transponder means is attached to said data medium.

16. The apparatus according to claim 15 said transponder means including an energy transfer means for providing operating power to said transponder.

17. A method for providing a secure data medium comprising:

creating frames of data to be stored on said data medium;

for each of said frames of data, providing a header containing a frame identifying number;

encrypting each of said frames of data with an encryption key which is derived from the identifying number of its frame; and storing said encrypted data frames with said headers on a data medium;

fixing a transponder means to said data medium, said transponder means including means for determining a decryption key from each frame identifying number.

18. The method for providing a secure data medium according to claim 17 further comprising compressing said frames of data to be stored on said data medium.

19. The method for providing a secure data medium according to claim 17 wherein each said identifying number is a random number.

* * * * *